(No Model.)
W. VANDERMAN.
PIPE OR ROD CUTTER.
No. 444,995. Patented Jan. 20, 1891.
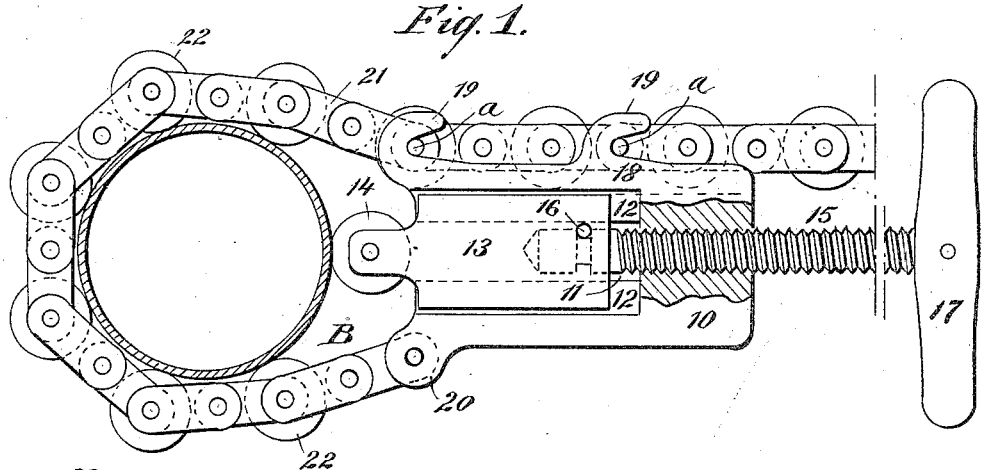
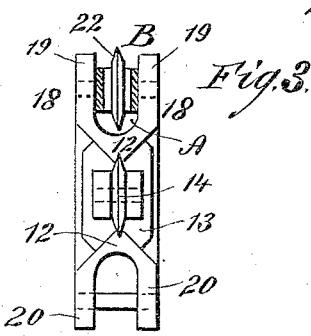
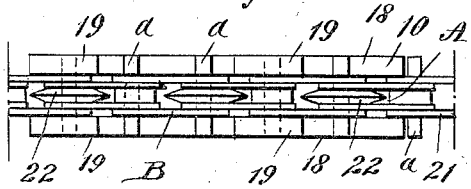
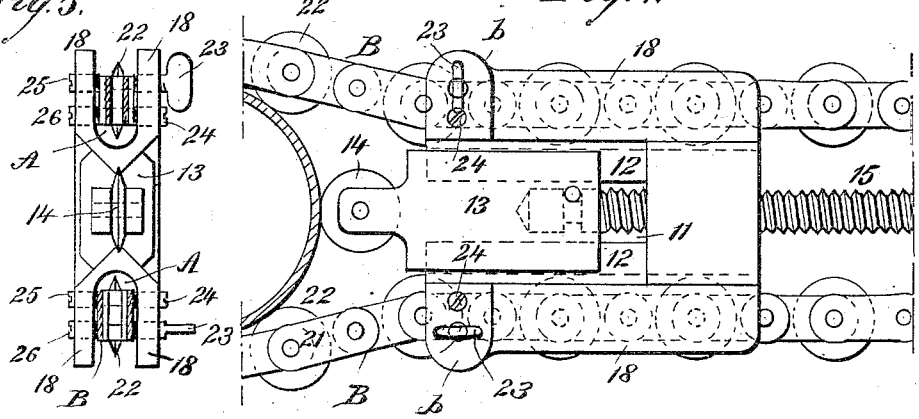
WITNESSES:
Dom Twitchell
C. Sedgwick
INVENTOR:
W. Vanderman
BY
Munn
ATTORNEYS

UNITED STATES PATENT OFFICE.

WILLIAM VANDERMAN, OF WILLIMANTIC, CONNECTICUT.

PIPE OR ROD CUTTER.

SPECIFICATION forming part of Letters Patent No. 444,995, dated January 20, 1891.

Application filed October 3, 1890. Serial No. 366,937. (No model.)

*To all whom it may concern:*

Be it known that I, WILLIAM VANDERMAN, of Willimantic, in the county of Windham and State of Connecticut, have invented a new and useful Improvement in Pipe or Rod Cutters, of which the following is a full, clear, and exact description.

My invention relates to an improvement in pipe or rod cutters, and has for its object to provide a durable and simple device capable of adjustment to pipes or rods of various sizes; and a further object of the invention is to so construct the tool that the cutters will surround the periphery of the pipe or rod and adapt themselves to any inequalities in the said exterior surface.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the tool, the frame being partly in section. Fig. 2 is a partial plan view of the tool. Fig. 3 is a front elevation thereof, the chain of cutters being detached at one edge of the frame and shown in cross-section at the opposite edge. Fig. 4 is a side elevation of a slightly-modified form of the tool; and Fig. 5 is a front elevation of the body of the modified tool and a cross-section through the chain of cutters.

The frame 10 may be of any desired shape, but it is preferably made somewhat rectangular and provided in its forward or outer end with a longitudinal recess 11, on the top and bottom walls of which recess, essentially V-shaped ribs 12 are produced. In the recess 11 of the body-frame a block 13 is held to slide, the top and bottom edges of which block have formed therein grooves corresponding in shape to the ribs 12, the said ribs forming slideways for the block. The outer or forward end of the block has pivoted therein or thereto a cutter 14, preferably of disk pattern, and the block is given lateral movement in the frame through the medium of a screw 15, which screw passes through a threaded aperture in the frame, as shown in Fig. 1, and the inner end of the screw is swiveled in the rear end of the block. The ordinary manner of attaching the screw is illustrated in the drawings, and consists in producing a peripheral channel in the screw and passing through the block and channel a pin 16. The outer end of the screw, which may be of any desired length, has attached thereto any approved form of handle 17.

In the preferred style of tool, flanges 18 are projected upward from the upper side edges of the frame, forming thereby a longitudinal channel A, as best shown in Fig. 3, and the flanges 18 have hook-like retaining-lugs 19, preferably formed integral therewith, which hook-like lugs face the rear of the tool, one being located between its ends and the other at its forward or front end, as is best shown in Fig. 1.

At the lower front or forward end of the frame ears 20 are formed, and between the said ears one end of a chain B is pivoted. The links 21 of the chain are pivotally connected, and at desired intervals in the length of the chain, between the links, cutters 22, preferably of disk shape, are pivoted. The pivotal pins of the cutters are made to project somewhat beyond the outer faces of the links of the chain, as indicated at $a$ in Fig. 2, and if in practice it be found desirable the pins connecting each of the links may likewise be extended beyond the sides of the chain. The object of this construction is that when the chain is looped around the pipe, as shown in Fig. 1, and the cutters are brought in engagement with its exterior surface, the chain may be held in this position by certain of the pivotal pins of the cutters or the links engaging with the retaining-lugs 19 of the frame. When the chain has been drawn tightly around the article to be cut, the rotary cutter of the reciprocating block 13 also engages with the article, and by forcing the block 13 forward by means of the screw 15 the frame is drawn rearward, the chain tightened, and all of the cutters are made to bear firmly against the pipe or rod, which may be severed conveniently and expeditiously by rocking the tool or giving it a rotary movement around the pipe or rod, at the same time manipulating the screw 15 to keep the cutters in constant firm engagement with the article.

It will be observed that by providing a chain as a carrier for the cutters the said cutters may be made to adapt themselves to any roughness or inequalities in the exterior surface of the article to be operated upon.

In Fig. 4 the construction of the tool varies but slightly from that shown in Fig. 1, the difference consisting only in that a channel A is formed both at the top and bottom of the frame, which channels at their forward ends are re-enforced in any suitable or approved manner, as illustrated at b. In the re-enforced portion of the channels a set-screw 23 is introduced at one side, and also a binding-screw 24, and at the opposite side of said channels, immediately opposite the binding-screws 24 and set-screws 23, two binding-screws 25 and 26 are located. The inner ends of these screws extend within the channels, and are preferably serrated or otherwise roughened.

When the tool is constructed as shown in Fig. 4, the chain of cutters is held in engagement with both the top and bottom surfaces of the frame by being clamped between the opposed binding-screws and set-screws, as shown in Fig. 5. One end of the chain need rarely be disconnected from the frame, the adjustment being effected at the opposite end.

Having thus described my invention, I claim as new and desire to secure by Letters Patent—

1. In a device of the character described, a chain adapted to surround the article to be cut, and a series of cutters carried by the chain, substantially as and for the purpose specified.

2. In a device of the character described, a chain adapted to surround the article to be cut, and a series of disk cutters pivotally attached to the chain, substantially as and for the purpose specified.

3. In a device of the character described, a body-frame, a chain attached to the frame, adapted to surround the article to be cut, rotary cutters mounted in the links of the chain, and an adjusting device connected with the frame, as and for the purpose specified.

4. In a device of the character described, a body-frame, a chain adjustably attached to the frame and adapted to surround the article to be cut, rotary cutters mounted in the links of the chain, and an adjusting device connected with the frame and also provided with a rotary cutter, as and for the purpose specified.

5. In a device of the character described, the combination, with a body-frame, a block held to slide in the frame, a rotary cutter attached to one end of the block, and an adjusting device connected with the opposite end of the said block, of a chain connected with the frame and adapted to surround the article to be cut, and cutters pivoted to the links of the chain, substantially as shown and described, and for the purpose specified.

6. In a device of the character described, the combination, with a frame, a block held to slide in the frame, a cutter secured to one end of the block, and an adjusting device connected with the opposite end of the block, of a chain connected with the frame and adapted to surround the article to be cut, disk cutters pivoted in the links of the chain, and a locking device, substantially as shown and described.

WILLIAM VANDERMAN.

Witnesses:
J. FRED. ACKER,
C. SEDGWICK.